(12) United States Patent
Holper

(10) Patent No.: US 11,878,728 B2
(45) Date of Patent: Jan. 23, 2024

(54) FOLDABLE COT AND A BUGGY

(71) Applicant: Milk Holding B.V., Amsterdam (NL)

(72) Inventor: Michel Paul René Holper, Haarlem (NL)

(73) Assignee: Milk Holding B.V., Amsterdam (NL)

( * ) Notice: Subject to any disclaimer, the term of this patent is extended or adjusted under 35 U.S.C. 154(b) by 294 days.

(21) Appl. No.: 17/615,958

(22) PCT Filed: Jun. 4, 2020

(86) PCT No.: PCT/NL2020/050361
§ 371 (c)(1),
(2) Date: Dec. 2, 2021

(87) PCT Pub. No.: WO2020/246883
PCT Pub. Date: Dec. 10, 2020

(65) Prior Publication Data
US 2022/0312986 A1    Oct. 6, 2022

(30) Foreign Application Priority Data

Jun. 4, 2019  (NL) .................................... 2023257

(51) Int. Cl.
*B62B 7/14*    (2006.01)
*A47D 7/00*    (2006.01)
*B62B 7/06*    (2006.01)

(52) U.S. Cl.
CPC .............. *B62B 7/147* (2013.01); *A47D 7/002* (2013.01); *B62B 7/062* (2013.01); *B62B 7/14* (2013.01); *A47D 7/00* (2013.01)

(58) Field of Classification Search
CPC .......... A47D 7/002; A47D 7/005; A47D 7/00; A47D 13/06; A47D 13/061; A47D 13/063; A47D 13/066; B62B 7/14; B62B 7/147; B62B 7/062; B62B 7/06
USPC ............. 5/111, 110, 112, 114, 655, 657, 652
See application file for complete search history.

(56) References Cited

U.S. PATENT DOCUMENTS

| | | | |
|---|---|---|---|
| 2,565,415 A | | 8/1951 | Welsh |
| 2022/0312986 A1 | * | 10/2022 | Holper .................... B62B 7/062 |
| 2023/0365180 A1 | * | 11/2023 | Yuan .................... A47D 13/027 |

FOREIGN PATENT DOCUMENTS

| | | | | |
|---|---|---|---|---|
| CN | 104670294 A | | 6/2015 | |
| DE | 202005019191 U1 | | 2/2006 | |
| EP | 3979879 B1 | * | 8/2023 | ............. A47D 7/002 |
| WO | WO-2020246883 A1 | * | 12/2020 | ............. A47D 7/002 |

* cited by examiner

*Primary Examiner* — Robert G Santos
(74) *Attorney, Agent, or Firm* — Hoffmann & Baron LLP

(57) ABSTRACT

The invention relates to a foldable cot, comprising a bottom portion and a stretchable side wall. The cot further comprises a movable frame for stretching the side wall to an unfolded state. The foldable cot also comprises an adapter mounted to a side wall frame element for connecting the foldable cot to a bearing frame of a buggy, the adapter having a rotatable element that is rotatably attached to the side wall frame element, and an engaging element fixedly attached to the rotatable element such that upon pivoting the frame arm for unfolding the side wall, the frame arm also engages the engaging element inducing the rotatable element to swivel relative to the side wall frame element of the frame for bringing the cot in a mainly horizontal orientation.

19 Claims, 2 Drawing Sheets

FOLDABLE COT AND A BUGGY

Cots are known for moving relatively young children, in particular children younger than circa one year. In order to provide a stable, comfortable and safe position of the children lying in cots, said cots have high side walls for protection of the child, and are held mainly horizontal. Cots can be rigid or foldable, the latter having the advantage of being relatively compact if not in use.

A known foldable cot comprises a bottom portion and a stretchable side wall extending from the bottom portion upwardly to an upper edge of the side wall, further comprising a frame movable from a folded state wherein the upper edge of the side wall is close to the bottom portion, and an unfolded state wherein the side wall is stretched such that the upper edge of the side wall is remote from the bottom portion, the frame including a side wall frame element and a frame arm extending along the side wall of the foldable cot, the frame arm being pivotably attached to the side wall frame element and having a bottom end that exerts, in the unfolded state, a force on the bottom portion of the cot, away from the side wall frame element.

By applying a movable frame, a foldable cot can be brought in an operational state having unfolded side walls, and an in-operational state having folded side walls.

For the purpose of carrying somewhat older children in a convenient way, foldable buggies are known, also having the advantage of being relatively compact in folded state.

In principle, a cot can be combined with a buggy, thereby having the flexibility of providing a vehicle that can be used for moving young children in the extended age range of a baby to several years old. However, when not in use, the composition of cot and buggy is still relatively large also if the cot is foldable thus having the disadvantage of occupying a relatively large volume.

It is an object of the present invention to provide a foldable cot that can be mounted on a buggy while maintaining the advantage that the composition can be made compact in a relatively easy way. Thereto, according to an aspect of the invention, a foldable cot according to the preamble is provided, the foldable cot also comprising an adapter mounted to the side wall frame element for connecting the foldable cot to a bearing frame of a buggy, the adapter having a rotatable element that is rotatably attached to the side wall frame element, the adapter further having connecting means fixedly attached to the rotatable element for connecting to a portion of said bearing frame of a buggy, the adapter also having an engaging element fixedly attached to the rotatable element and extending from the side wall beyond the frame arm such that upon pivoting the bottom end of the frame arm towards the bottom portion so as to bring the frame in the unfolded state, the frame arm engages the engaging element inducing the rotatable element and the connecting means to swivel relative to the side wall frame element of the frame.

By applying an adapter provided with a rotatable element provided with a fixedly attached engaging element, the action of unfolding the cot can be effectively combined with bringing the cot in an orientation wherein its bottom portion is mainly horizontal, ready for carrying a child. Similarly, the action of folding the cot can be effectively combined with turning the cot in tilted position, preferably mainly parallel to bearing frame elements of the buggy, thus minimizing its volume, in particular if the bearing frame of the buggy is folded. Then, the foldable cot and the buggy can advantage be brought in a compact state, ready for storage and/or transport. Further, if desired, the cot can be connected or disconnected from the buggy while being in the unfolded state i.e. in a state wherein a child may lie therein, in a comfortable and safe way. Then, the user may remove the cot from a buggy chassis while maintaining the side walls in the unfolded, expanded state.

Preferably, the foldable cot comprises a stop fixedly mounted on the side wall frame element for blocking, in the unfolded state, a swiveling movement of the engaging element, thereby fixing the orientation of the cot after unfolding.

Advantageously, two adapters can be mounted to respective side wall frame elements in corresponding stretchable side walls, opposite to each other, for connecting the foldable cot to a pair of bearing frame elements of a buggy, thereby providing a stable structure.

Specifically, the frame may have two frame arms, each frame arm extending along a respective side wall of the foldable cot, such that upon pivoting the frame arms towards the bottom portion so as to bring the frame in the unfolded state, the frame arms engage the engaging element of the corresponding adapter inducing the rotatable element and the connecting means of the corresponding adapter to swivel relative to the side wall frame element of the frame.

Bottom ends of the two frame arms can be mutually connected, e.g. for forming an integrated handle.

Preferably, the adapter is arranged for releasably connecting the foldable cot to a bearing frame of a buggy such that the foldable cot can be mounted and removed from the buggy.

The invention also relates to a buggy having a bearing frame and a foldable cot as described above, the foldable being connected to the bearing frame via at least one adapter of said foldable cot.

Further advantageous embodiments according to the invention are described in the following claims.

It should be noted that the technical features described above or below may each on its own be embodied in a foldable cot, i.e. isolated from the context in which it is described, separate from other features, or in combination with only a number of the other features described in the context in which it is disclosed. Each of these features may further be combined with any other feature disclosed, in any combination.

The invention will now be further elucidated on the basis of a number of exemplary embodiments and an accompanying drawing. In the drawing.

It is noted that the figures show merely a preferred embodiment according to the invention. In the figures, the same reference numbers refer to equal or corresponding parts.

Figure 1:
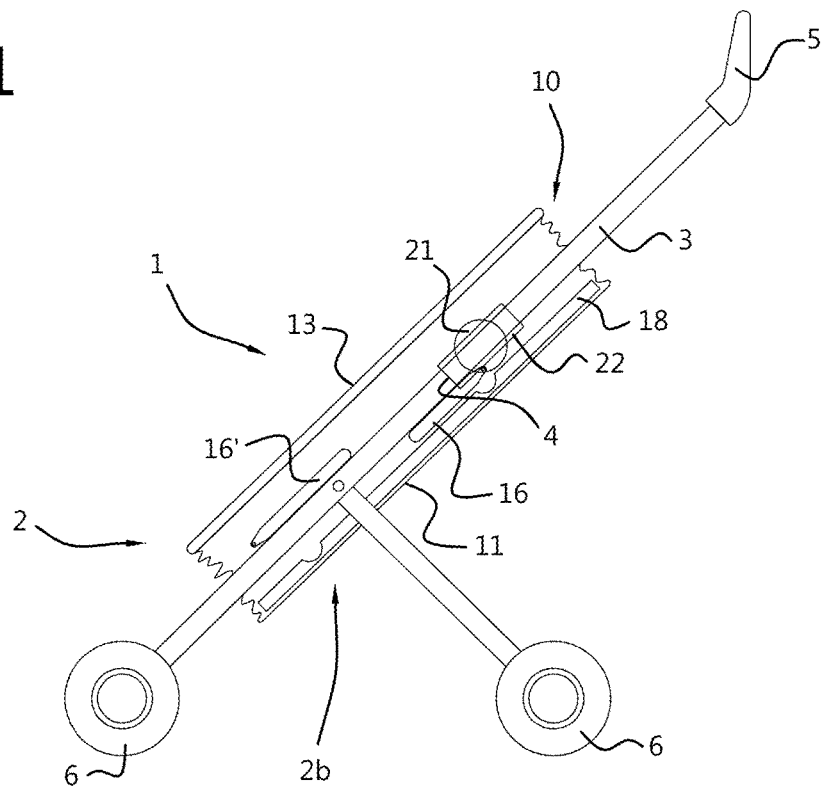
FIG. 1 shows a schematic left side view of a buggy having a bearing frame and a foldable cot according to the invention, the cot being in a folded state.

FIG. 1 shows a schematic left side view of a buggy 1 having a bearing frame 2 and a foldable cot 10 according to the invention. The bearing frame 2 generally includes a pair of frame elements 3 extending mainly parallel to each other, each frame element 3 having a frame portion 4 arranged for engagement with a corresponding adapter 20 of the foldable cot 10, as described in more detail below referring to FIG. 3. The buggy 1 also includes a handle 5 connected to a top portion 2a of the bearing frame 2 for manually controlling movement of the buggy 1. Further, a bottom portion 2b of the bearing frame 2 is provided with supporting wheels 6, e.g. three or four wheels 6. In FIG. 1, the buggy 1 is shown as visible from a position on the left hand side of a person handling the buggy 1.

Advantageously, the bearing frame 2 can be foldable from a operational state wherein the bearing frame 2 is extended and may carry the foldable cot 10, to an in-operational state wherein the bearing frame 2 is collapsed so as to occupy a reduced volume, e.g. for storage and/or transport purposes.

The foldable cot 10 has a bottom portion 11 for carrying a mattress or similar, and a stretchable side wall 12 extending from the bottom portion 11 upwardly to an upper edge 13 of the side wall 12. Typically, the foldable cot 10 is boxed shaped, its bottom portion 11 having a rectangular contour. Then, the side wall 12 may include four mainly flat side wall sections 12a-d, in their extended state, viz. a front side wall 12a, near the handle 5, a left side wall 12b and a right side wall 12c both adjoining the front side wall 12a but located opposite to each other, and a back side wall 12d adjoining both the left and right side walls 12b,c but located opposite to the front side wall 12a. The stretchable side wall 12 may include elastic and/or non-elastic material. In the collapsed state of the bearing frame 2, the stretchable side wall 12 generally has a corrugated cross-sectional profile including pleats and/or folds, while in the extended state, the stretchable side wall 12 is stretched or folded out, then having a more flat cross sectional profile, including less or no pleats and/or folds. The foldable cot 10 also includes a frame movable from a folded state wherein the upper edge 13 of the side wall 12 is close to the bottom portion 11, and an unfolded state wherein the side wall 12 is stretched such that the upper edge 13 of the side wall 12 is remote from the bottom portion 11. In the unfolded state, the side wall 12 extends to a relatively high level so as to form a side shield for a child lying in the cot 10. Similarly, in the folded state, the side wall 12 is folded extending to a relatively low level so that the cot 10 is smaller, occupying a reduced volume, e.g. for compact storage and/or transport purposes.

The cot frame may include a number of frame elements that are movable relative to each other for stretching and relaxing, respectively, the stretchable side wall 12.

Figure 2:
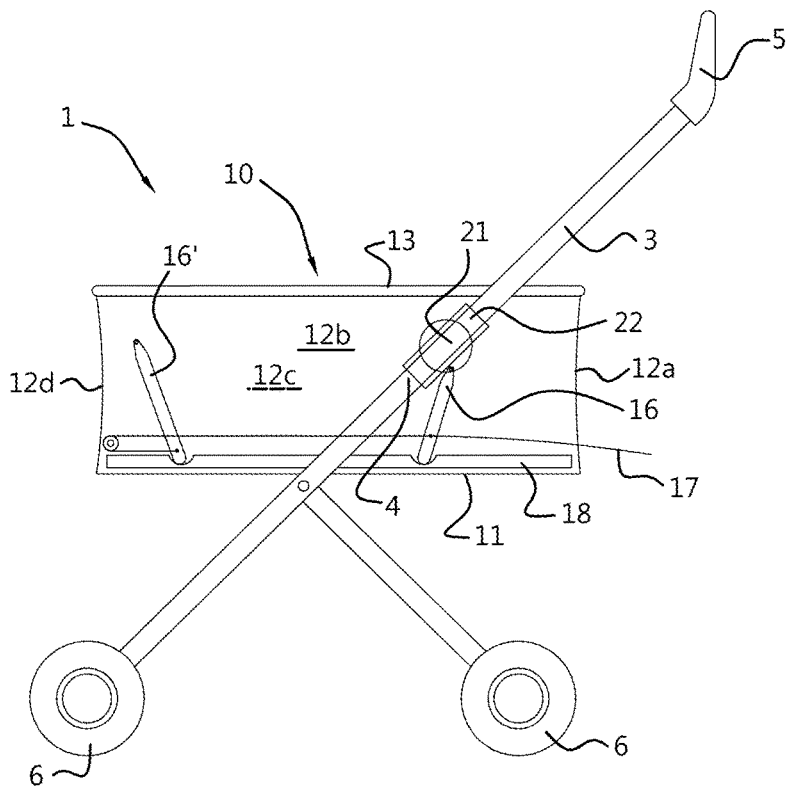
FIG. 2 shows a schematic left side view of the buggy shown in FIG. 1, the cot being in an unfolded state.

The cot frame includes a side wall frame element 15 located near the upper edge 13 of the side wall 12, and a frame arm 16 having a top arm end 16a that is pivotably attached to the side wall frame element 15. Generally, the frame arm 16 extends along the side wall 12, preferably along the left side wall 12b or the right wall 12c, preferably along at a side of the side wall 12 facing into the interior of the cot frame 10 or inside the side wall 12 itself. The frame arm 16 has a bottom arm end 16b, opposite to the top arm end 16a. In the folded state, the bottom arm end 16b may be close to the upper edge 13 of the side wall 12. Then, the frame arm 16 is generally parallel to the upper edge 13 of the side wall 12, as shown in FIG. 1 wherein the cot is in a folded state. In the unfolded state, the bottom arm end 16b has pivoted downwardly, towards the bottom portion 11 of the cot 10. Then, the bottom arm end 16b exerts a force on the bottom portion 11 of the cot 10, away from the upper edge 13 of the side wall 12, away from the side wall frame element 15 so as to move the side wall frame element 15 upwardly stretching the side wall 12 between the bottom portion 11 of the cot 10 and the upper edge 13 of the side wall 12, as shown in FIG. 2 wherein the cot is in an unfolded state. The frame may include a bottom frame element 18, e.g. as shown in FIG. 2, that may receive a downwardly oriented force exerted by the bottom arm end 16b. In the unfolded state, the second arm 16 may form a distance holder defining a distance between the bottom portion 11 of the cot and the side wall frame element 15, stretching the side wall 12 between the cot bottom portion 11 and the side wall frame element 15. The side wall frame element 15 may extend along a substantial portion of the upper edge 13 of the side wall 12. Then, the frame may include a pair of frame arms 16, 16' that are pivotably mounted to said side wall frame element 15, however, offset with respect to each other, a first frame arm close to the back side wall 12d and a second frame arm close to the front side wall 12a. By pivoting the bottom ends of the pair of frame arms 16, 16' downwardly, in clockwise and counter-clockwise direction, respectively, the upper edge 13 of the left side wall 12b is moved away from the bottom portion 11, thereby bringing the cot 10 from the folded state to the unfolded state. In a practical embodiment, a similar frame construction is applied at the right side wall 12c, opposite to the left side wall 12b. Then, the bottom ends of corresponding pivotable frame arms 16 of the cot 10 can be connected via intermediate frame tubes traversing from the left side wall 12b to the right side wall 12c thus forming two integrated pivotable handle arms. Upon pivoting the integrated handle arms towards the bottom portion 11, and away from each other, the cot can be brought in the unfolded state. The pivotal moment of both handle arms can e.g. be induced by pulling a strap 17 that is connected to both handle arms 16, 16'.

The foldable cot 10 also comprising an adapter 20 mounted to the side wall frame element 15 for connecting the foldable cot 10 to the bearing frame 2 of the buggy 1.

Figure 3:
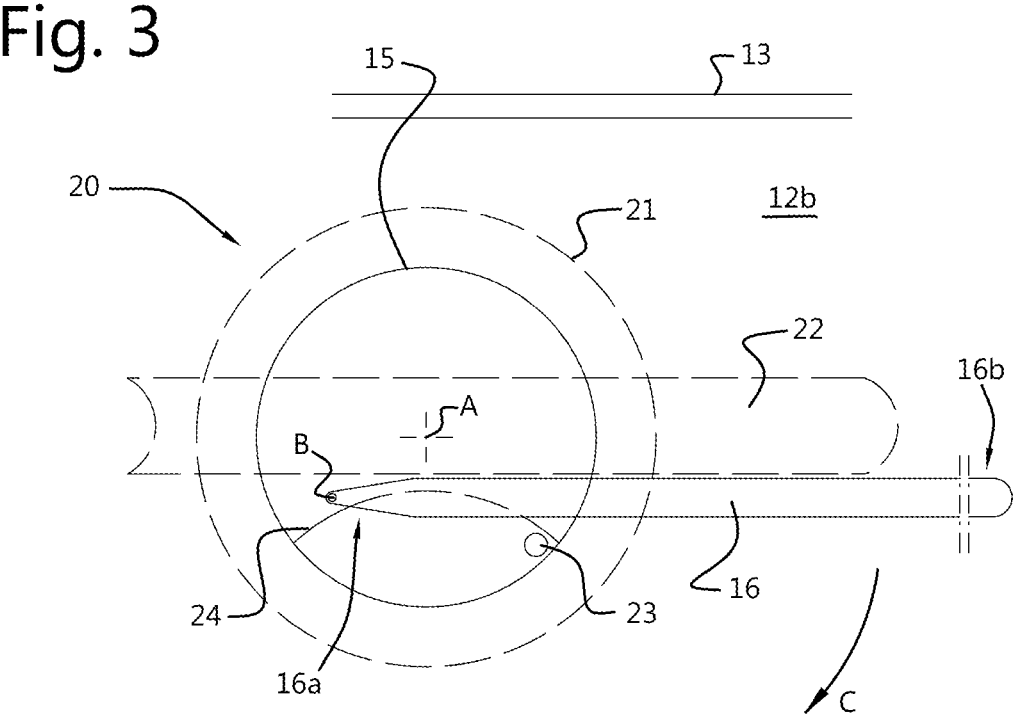
FIG. 3 shows a schematic view of an adapter provided at a left side wall of the buggy shown in FIG. 1, the adapter being in a state corresponding to a folded state of the buggy.
Figure 4:
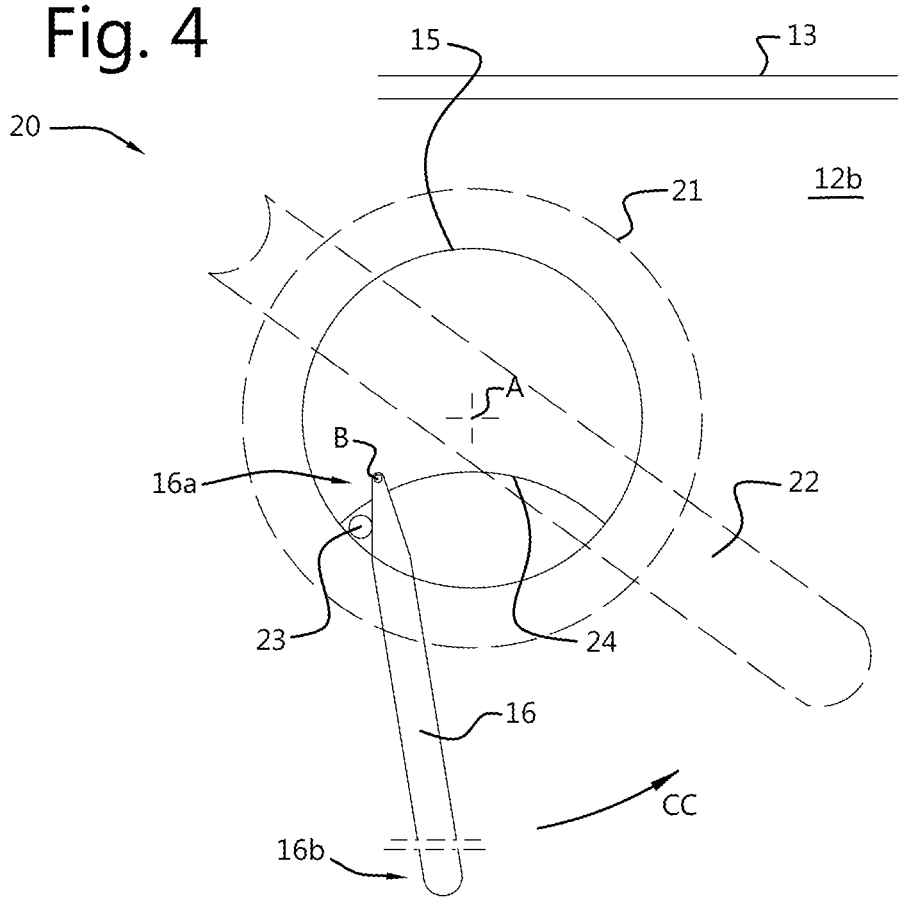
FIG. 4 shows a schematic view of the adapter shown in FIG. 3, the adapter being in a state corresponding to an unfolded state of the buggy.

FIG. 3 shows a schematic view of an adapter 20 provided at a left side wall of the buggy 1 shown in FIG. 1, the adapter 20 being in a state corresponding to a folded state of the buggy 1, and FIG. 4 shows a schematic view of the adapter 20 shown in FIG. 3, the adapter 20 being in a state corresponding to an unfolded state of the buggy 1.

In FIGS. 3 and 4, the adapter 20 mounted to the side wall frame element 15 in the left side wall 12b is shown as visible from the interior of the foldable cot 10. The adapter 20 has a rotatable element 21 that is rotatably attached to the side wall frame element 15 to which frame arm 16 is pivotably mounted. The adapter 20 has also connecting means 22 fixedly attached to the rotatable element 21 for connecting to a portion 4 of said bearing frame 2 of the buggy 1 as shown in FIGS. 1 and 2. In the shown embodiment, the connecting means include an elongate guiding structure 22 provided with a curved open channel receiving a tube shaped portion 4 of the buggy bearing frame 2. The elongate guiding structure 22 releasably couples to the bearing frame 2 portion of the buggy for carrying the foldable cot 10. Apparently, the elongate guiding structure 22 and the corresponding bearing frame portion 4 may have another geometry however such that may releasably engage each other for carrying the foldable cot 10. Further, alternative to the elongate guiding structure, the connecting means can be implemented in another manner, e.g. as a bolt and nut connection.

The adapter 20 further has an engaging element 23 fixedly attached to the rotatable element 21 and extending from the side wall 12b beyond the frame arm 16 such that upon pivoting the frame arm 16 in a clockwise manner towards the bottom portion 11 so as to bring the cot frame in the unfolded state, the frame arm 16 engages the engaging element 23, as a lever, inducing the rotatable element 21 of the adapter 20 and the elongate guiding structure 22 to swivel relative to the side wall frame element 15 of the frame. Then, as the elongate guiding structure 22 is releasably coupled to the bearing frame 2 portion of the buggy 1, also the orientation of the cot 10 relative to the buggy frame 2 changes.

By pivoting the frame arm 16 in a clockwise manner C towards the bottom portion 11, the rotatable element 21 of the adapter is induced to swivel also clockwise, when seen from the interior of the cot 10. When, seen from the exterior left side of the buggy 1, as illustrated in FIGS. 1 and 2, the rotatable element 21 and the elongate guiding structure swivel counter clockwise CC forcing the cot 10 from a tilted orientation shown in FIG. 1, corresponding to the folded state, towards a mainly horizontal orientation shown in FIG. 2, corresponding to the unfolded state.

Then, by pivoting the frame arm 16 downwardly, in the clockwise direction C shown in FIG. 3, the cot 10 is unfolded, tensioning the fabric of the side wall 12, and the cot 10 is brought in an orientation wherein its bottom portion 11 is mainly horizontal, ready for operational use.

Similarly, by pivoting the pivoting arm 16 upwardly, in the counter clockwise direction CC as shown in FIG. 4, the cot 10 is folded, relaxing the fabric of the side wall 12, and the cot 10 is brought in an orientation wherein the its bottom portion 11 is tilted, as shown in FIG. 1, ready for storage and/or transport, especially if the bearing frame 2 is brought in a more compact state.

In a preferred embodiment, the right side wall 12c is provided with a similar adapter structure thereby providing symmetric forces in particular if the corresponding frame arms are formed as an integrated handle arm as described above. Then, upon pivoting the frame arms or integrated handle arm towards the bottom portion 11 so as to bring the cot frame in the unfolded state, the frame arms engage the engaging element of the corresponding adapter inducing the rotatable element 21 and the elongate guiding structure 22 of the corresponding adapter 20 to swivel relative to the top frame element of the frame.

The engaging element 23 of the adapter can be formed as a pen, pin or other structure extending from the rotatable element 21 inwardly in the space surrounded by the side wall 12a-d so as to be operated by the frame arm 16. Further, the rotatable element 21 of the adapter may be formed as a disc, as shown in FIGS. 3 and 4, or as another generally flat structure that is rotatably mounted to the side wall frame element 15 such that it may rotate relative to a rotation axis A. The pivotable frame arm 16 is pivotably mounted to the side wall frame element 15 such that the frame arm 16 may pivot relative to a pivoting axis B. The rotation axis A and the pivoting axis B generally do not coincide but are generally parallel to each other having a mutual offset designed such that the rotatable element 21 can be easily driven by manually pivoting the frame arm 16. The side wall frame element 15 can also be formed as a disc, as shown in FIGS. 3 and 4, or as another generally flat structure that is stationary mounted relative to the upper edge 13 of the side wall. In the shown embodiment, the side wall frame element 15 is positioned in a mainly concentric position relative to the rotatable element 21. The side wall frame element 15 is partially cut out defining cut edge 24 bounding a swiveling range of the rotatable element 21 relative to the side wall frame element 15. Advantageously, end positions of the swiveling range correspond to frame arm positions corresponding to the unfolded and folded state, respectively, of the cot 10. In FIG. 3, the engaging element 23 is in a first end position, corresponding to the folded state, while in FIG. 4, the engaging element 23 is in a second end position, opposite to the first end position, the second end position corresponding to the unfolded state. Then, upon bringing the bottom end of the frame arm 16 downwardly, in the folded state of the cot frame, the adapter is locked in a swivel position, then also fixing the orientation of the cot 10. As such, the partial cut out geometry of the side wall frame element 15 forms a stop for blocking, in the unfolded state, a swiveling movement of the engaging element 23, the rotation element 21, the elongate guiding element 22 and the cot 10. It is noted that the stop can be implemented in another way, e.g. as a separate or integrated element fixedly mounted to the side wall frame element 15.

The invention is not restricted to the embodiments described above. It will be understood that many variants are possible.

In the shown embodiment, the side wall frame element 15 is located near the upper edge 13 of the side wall 12. Then, the frame arm can be pivotably attached to the side wall frame element, at a top end 16a of the frame arm, opposite to the bottom end 16b of the frame arm, as shown in FIGS. 3 and 4.

However, in principle, the side wall frame element 15 can be located in a more lower position, e.g. halfway between the upper edge 13 of the side wall on the one hand, and the bottom portion 11 of the cot 10 on the other hand. Then, the frame arm 16 may extend beyond the pivoting axis B e.g. for pushing the upper edge 13 of the side wall 12 upwardly relative to the side wall frame element 15 upon pushing the bottom portion 11 of the cot 10 downwardly relative to the side wall frame element 15.

These and other embodiments will be apparent for the person skilled in the art and are considered to fall within the scope of the invention as defined in the following claims. For the purpose of clarity and a concise description features are described herein as part of the same or separate embodiments. However, it will be appreciated that the scope of the invention may include embodiments having combinations of all or some of the features described.

I claim:

1. A foldable cot comprising:
   a bottom portion and a stretchable side wall extending from the bottom portion upwardly to an upper edge of the side wall,
   further comprising a frame movable from a folded state wherein the upper edge of the side wall is close to the bottom portion, and an unfolded state wherein the side wall is stretched such that the upper edge of the side wall is remote from the bottom portion, the frame including a side wall frame element and a frame arm extending along the side wall of the foldable cot, the frame arm being pivotably attached to the side wall frame element and having a bottom end that exerts, in the unfolded state, a force on the bottom portion of the cot, away from the side wall frame element,
   the foldable cot also comprising an adapter mounted to the side wall frame element for connecting the foldable cot to a bearing frame of a buggy, the adapter having a rotatable element that is rotatably attached to the side wall frame element, the adapter further having connecting means fixedly attached to the rotatable element for connecting to a portion of said bearing frame of a buggy, the adapter also having an engaging element fixedly attached to the rotatable element and extending from the side wall beyond the frame arm such that upon pivoting the bottom end of the frame arm towards the bottom portion so as to bring the frame in the unfolded state, the frame arm engages the engaging element inducing the rotatable element and the connecting means to swivel relative to the side wall frame element of the frame.

2. A foldable cot according to claim 1, further comprising a stop fixedly mounted on the side wall frame element for blocking, in the unfolded state, a swiveling movement of the engaging element.

3. A foldable cot according to claim 1, comprising two adapters mounted to respective side wall frame elements in corresponding stretchable side walls, opposite to each other for connecting the foldable cot to a pair of bearing frame elements of a buggy.

4. A foldable cot according to claim 3, wherein the frame has two frame arms, each frame arm extending along a respective side wall of the foldable cot, such that upon pivoting the frame arms towards the bottom portion so as to bring the frame in the unfolded state, the frame arms engage the engaging element of the corresponding adapter inducing the rotatable element and the connecting means of the corresponding adapter to swivel relative to the side wall frame element of the frame.

5. A foldable cot according to claim 4, wherein the bottom ends of the two frame arms are mutually connected.

6. A foldable cot according to claim 1, wherein the frame arm is pivotably attached to the side wall frame element, at a top end of the frame arm, opposite to the bottom end of the frame arm.

7. A foldable cot according to claim 1, wherein the adapter is arranged for releasably connecting the foldable cot to a bearing frame of a buggy.

8. A buggy having a bearing frame and a foldable cot according to claim 1 that is connected to the bearing frame via at least one adapter of said foldable cot.

9. A foldable cot according to claim 2, comprising two adapters mounted to respective side wall frame elements in corresponding stretchable side walls, opposite to each other for connecting the foldable cot to a pair of bearing frame elements of a buggy.

10. A foldable cot according to claim 2, wherein the frame arm is pivotably attached to the side wall frame element, at a top end of the frame arm, opposite to the bottom end of the frame arm.

11. A foldable cot according to claim 2, wherein the adapter is arranged for releasably connecting the foldable cot to a bearing frame of a buggy.

12. A buggy having a bearing frame and a foldable cot according to claim 2 that is connected to the bearing frame via at least one adapter of said foldable cot.

13. A foldable cot according to claim 3, wherein the frame arm is pivotably attached to the side wall frame element, at a top end of the frame arm, opposite to the bottom end of the frame arm.

14. A foldable cot according to claim 3, wherein the adapter is arranged for releasably connecting the foldable cot to a bearing frame of a buggy.

15. A foldable cot according to claim 4, wherein the frame arm is pivotably attached to the side wall frame element, at a top end of the frame arm, opposite to the bottom end of the frame arm.

16. A foldable cot according to claim 4, wherein the adapter is arranged for releasably connecting the foldable cot to a bearing frame of a buggy.

17. A foldable cot according to claim 5, wherein the frame arm is pivotably attached to the side wall frame element, at a top end of the frame arm, opposite to the bottom end of the frame arm.

18. A foldable cot according to claim 5, wherein the adapter is arranged for releasably connecting the foldable cot to a bearing frame of a buggy.

19. A foldable cot according to claim 6, wherein the adapter is arranged for releasably connecting the foldable cot to a bearing frame of a buggy.

\* \* \* \* \*